United States Patent
Halimi et al.

(10) Patent No.: US 11,237,574 B2
(45) Date of Patent: Feb. 1, 2022

(54) FLUID MONITORING AND CONTROL SYSTEM

(71) Applicant: Flo Technologies, Inc., Culver City, CA (US)

(72) Inventors: Henry M. Halimi, Los Angeles, CA (US); Timothy Claver Brock, Ventura, CA (US)

(73) Assignee: Flo Technologies, Inc., Culver City, CA (US)

(*) Notice: Subject to any disclaimer, the term of this patent is extended or adjusted under 35 U.S.C. 154(b) by 0 days.

(21) Appl. No.: 16/948,713

(22) Filed: Sep. 29, 2020

(65) Prior Publication Data

US 2021/0011500 A1     Jan. 14, 2021

Related U.S. Application Data

(63) Continuation-in-part of application No. 15/849,669, filed on Dec. 21, 2017, now Pat. No. 10,866,601, which is a continuation of application No. 14/182,213, filed on Feb. 17, 2014, now Pat. No. 9,857,805.

(60) Provisional application No. 61/766,105, filed on Feb. 18, 2013, provisional application No. 62/909,176, filed on Oct. 1, 2019.

(51) Int. Cl.
  *G05D 16/20* (2006.01)
  *G05D 7/06* (2006.01)

(52) U.S. Cl.
  CPC ......... *G05D 16/20* (2013.01); *G05D 7/0635* (2013.01); *Y10T 137/7761* (2015.04)

(58) Field of Classification Search
  CPC ... F16K 31/042; F16K 37/005; G05D 7/0635; G05D 16/20; Y10T 137/7761
  See application file for complete search history.

(56) References Cited

U.S. PATENT DOCUMENTS

| | | |
|---|---|---|
| 4,418,712 A | 12/1983 | Braley |
| 5,038,268 A | 8/1991 | Krause |
| 5,038,821 A | 8/1991 | Maget |
| 5,660,198 A | 8/1997 | McClaran |
| 5,821,636 A | 10/1998 | Baker |
| 5,927,400 A | 7/1999 | Bononi et al. |
| 5,971,011 A | 10/1999 | Price |
| 6,539,968 B1 | 4/2003 | White |
| 6,789,411 B2 | 9/2004 | Roy |

(Continued)

*Primary Examiner* — Kevin R Barss
(74) *Attorney, Agent, or Firm* — Hackler Daghighian Martino & Novak

(57) ABSTRACT

A fluid control device includes an electric motor mechanically connected to a fluid valve and a sensor coupled to a fluid pipe section. The sensor may be a temperature, pressure or flow rate sensor. A control device processor is configured to enter into a pre-occupancy mode when powered and never previously wirelessly connected to a remotely disposed fluid monitoring and control system. The pre-occupancy mode may close the fluid valve if at least one of the following occurs: exceeding a first preset threshold for a pressure decay test; exceeding a second preset threshold for a maximum flow rate; exceeding a third preset threshold for a maximum flow duration; exceeding a fourth preset threshold for a maximum flow volume; exceeding below a fifth preset threshold for a low temperature; exceeding above a sixth preset threshold for a high temperature; and/or exceeding above a seventh preset threshold for a high pressure.

18 Claims, 5 Drawing Sheets

(56) References Cited

U.S. PATENT DOCUMENTS

| | | |
|---|---|---|
| 6,963,808 B1 | 11/2005 | Addink et al. |
| 6,994,309 B2 | 2/2006 | Fernandez-Sein |
| 7,119,698 B2 | 10/2006 | Schleich et al. |
| 7,304,587 B2 | 12/2007 | Boaz |
| 7,317,404 B2 | 1/2008 | Cumeralto et al. |
| 7,330,796 B2 | 2/2008 | Addink et al. |
| 7,360,413 B2 | 4/2008 | Jeffries et al. |
| 7,383,721 B2 | 6/2008 | Parsons et al. |
| 7,426,875 B1 | 9/2008 | McMillan |
| 7,920,983 B1 | 4/2011 | Peleg et al. |
| 7,966,099 B2 | 6/2011 | Fima |
| 7,969,318 B2 | 6/2011 | White et al. |
| 8,347,427 B2 | 1/2013 | Klicpera |
| 8,701,703 B2 | 4/2014 | Scott et al. |
| 8,887,324 B2 | 11/2014 | Klicpera |
| 9,019,120 B2 | 4/2015 | Broniak et al. |
| 9,266,136 B2 | 2/2016 | Klicpera |
| 9,297,150 B2 | 3/2016 | Klicpera |
| 9,494,480 B2 | 11/2016 | Klicpera |
| 9,749,792 B2 | 8/2017 | Klicpera |
| 2005/0016592 A1 | 1/2005 | Jeromson et al. |
| 2006/0028355 A1 | 2/2006 | Patterson et al. |
| 2011/0303311 A1 | 12/2011 | Klicpera |
| 2014/0130878 A1 | 5/2014 | Marinez |

…

FLUID MONITORING AND CONTROL SYSTEM

CROSS-REFERENCE TO RELATED APPLICATIONS

This continuation-in-part application claims priority to Ser. No. 15/849,669 filed on Dec. 21, 2017, which itself is a continuation application claiming priority to non-provisional application Ser. No. 14/182,213 filed on Feb. 17, 2014 which is U.S. Pat. No. 9,857,805 issued on Jan. 2, 2018, which itself claimed priority to provisional application 61/766,105 filed on Feb. 18, 2013. This continuation-in-part application also claims priority to provisional application 62/909,176 filed on Oct. 1, 2019. The contents of all these applications are fully incorporated herein with these references.

FIELD OF THE INVENTION

The present invention generally relates to fluid monitoring and control. More particularly, the present invention relates to a central hub that is in communication with a plurality of control devices placed at various locations to monitor and control fluids.

BACKGROUND OF THE INVENTION

The plumbing industry has lagged behind its related industries in development of fundamentally new and innovative technologies in recent decades. Due to the passive nature of fluids, the delivery of liquid, gas and air has hardly changed since their initial development decades ago. Improvements in the industry have traditionally been focused on product redesigns and the use of modified materials. The net effect of this stagnation has become aging product lines and sagging margins. Emergence of environmental, health, safety, conservation and also the increasing need for water damage mitigation has created enormous untapped opportunities.

Furthermore, there are no practical solutions for detection of very small leaks in the plumbing systems. These leaks cause hundreds of millions of dollars in mold and property damage in United States alone.

Accordingly, there is a need for a system that alleviates the problems in the prior art. The present invention fulfills these needs and provides other related advantages.

SUMMARY OF THE INVENTION

An embodiment of a fluid control device 32 has a fluid pipe section 33 including a fluid inlet 35 and a fluid outlet 34 configured to be connectable in series to a fluid pipe 36. A fluid valve 22 is coupled in series within the fluid pipe section separating a fluid inlet side 35 from a fluid outlet side 34. The fluid inlet side corresponds to the fluid inlet of the fluid pipe section and the fluid outlet side corresponds to the fluid outlet of the fluid pipe section. The fluid valve controls a fluid flow through the fluid pipe section.

An electric motor 2 is mechanically connected to the fluid valve. At least one sensor is coupled to the fluid pipe section. The at least one sensor comprises: a temperature sensor 39 monitoring a temperature of the fluid flow within the fluid pipe section; a pressure sensor 40 monitoring a pressure of the fluid flow within the fluid pipe section; and/or a flow rate sensor 38 monitoring a flow rate of the fluid flow within the fluid pipe section;

A control device processor 41 is controllably and electrically connected to the electric motor and electrically connected to the at least one sensor. A communication device 42, 46, 47 is coupled to the control device processor, the communication device configured to be wirelessly connectable to a remotely disposed fluid monitoring and control system 43, 50, 51, 52, 54.

The control device processor is configured to enter into a pre-occupancy mode when powered and never previously wirelessly connected to the fluid monitoring and control system. The pre-occupancy mode is configured to fully close the fluid valve if at least one of the following occurs: exceeding a first preset threshold for a pressure decay test; exceeding a second preset threshold for a maximum flow rate; exceeding a third preset threshold for a maximum flow duration; exceeding a fourth preset threshold for a maximum flow volume; exceeding below a fifth preset threshold for a low temperature; exceeding above a sixth preset threshold for a high temperature; and/or exceeding above a seventh preset threshold for a high pressure.

In other embodiments, if the pre-occupancy mode closes the fluid valve, the control device processor may be configured to illuminate an LED 60 or a display 60, the LED or the display being electrically connected to the control device processor.

In other embodiments, if the pre-occupancy mode closes the fluid valve, the control device processor is configured to sound an audible alarm by a speaker 61, the speaker being electrically connected to the control device processor.

The fluid control device may be configured to be in wireless communication with a second fluid control device disposed a distance apart. The second fluid control device may be configured to illuminate an LED or a display or sound an audible alarm by a speaker if the fluid control device has shut the fluid valve, wherein the LED, the display or the audible alarm is electrically connected to a control device processor of the second fluid control device.

The fluid control device may be configured to exit the pre-occupancy mode when the fluid control device is wirelessly connected to the fluid monitoring and control system and a user has requested the pre-occupancy mode be turned off.

The communication device may comprise a wireless communication transmitter and receiver 46, 47 configured to wirelessly communicate with the fluid monitoring and control system. The transmitter and receiver may be integrated inside the housing 1, such that no external modular units 46 are needed.

A housing 1 may enclose at least the electric motor and the control device processor.

The fluid flow may comprise a liquid flow, a gas flow, an air flow or a combination thereof.

A battery 49 or a power input 48 may be electrically connected to the control device processor.

The pressure sensor may be disposed on the fluid outlet side of the fluid valve and wherein no pressure sensor is disposed on the fluid inlet side of the fluid valve. The flow rate sensor may be a turbine wheel. The fluid valve may be a ball valve.

The temperature sensor and the pressure sensor may both be disposed on the fluid outlet side of the fluid valve.

The temperature sensor, the pressure sensor and the flow rate sensor may be all disposed on the fluid outlet side of the fluid valve.

The fluid monitoring and control device may comprise a portable electronic device 51, a computer 53 or a smart phone 54.

In another embodiment, a fluid monitoring and control system includes a central hub having a central processor, a user interface electronically coupled to the central processor and an input/output port electronically coupled to the central processor. A plurality of control devices communicate with the central hub. Each control device includes a fluid pipe section including a fluid inlet and a fluid outlet configured to be connectable in series to a fluid pipe. A fluid valve is coupled in series within the fluid pipe section, the fluid valve controlling a fluid flow through the fluid pipe section. An electric motor is mechanically connected to the fluid valve. A temperature sensor is coupled to the fluid pipe section monitoring a temperature of the fluid flow within the fluid pipe section. A pressure sensor is coupled to the fluid pipe section monitoring a pressure of the fluid flow within the fluid pipe section. A flow rate sensor is coupled to the fluid pipe section monitoring a flow rate of the fluid flow within the fluid pipe section. A control device processor is controllably connected to the electric motor, temperature sensor, pressure sensor and flow sensor. A control device input/output port is coupled to the control device processor, the control device input/output port in communication with the input/output port of the central hub. The fluid flow through any individual device may be a liquid flow, a gas flow, an air flow or a combination thereof.

In other exemplary embodiments a housing may enclose at least the electric motor and control device processor.

In other exemplary embodiments a control device wireless communication transmitter and receiver may be connectable to the control device input/output port.

In other exemplary embodiments a proximity sensor or a moisture sensor may be in communication with the central hub.

In other exemplary embodiments the input/output port of the central hub may include a central hub wireless communication transmitter and receiver in communication with the control device wireless communication transmitter and receiver.

In other exemplary embodiments the user interface may be a computer screen and a keyboard or a touch activated computer screen. The user interface may be a website accessible from a remote computer, a fire alarm system, a burglar alarm system, a mobile computer or a portable electronic device.

In other exemplary embodiments a communication wire may be connected physically between the input/output ports of the central hub and control device. In other exemplary embodiments a battery may be coupled to the control device processor. In other exemplary embodiments a power input may be electrically connected to the control device processor.

In other exemplary embodiments a speaker may be electrically connected to the central hub processor for sounding a warning sound. In other exemplary embodiments a light may be electrically connected the central hub processor for illuminating a warning light.

An exemplary method of fluid control includes providing a fluid monitoring and control system having the central hub and the plurality of control devices discussed herein and also installing software on the central processor of the central hub controlling the plurality of controlling devices, programming into the software a temperature threshold, a pressure threshold or a flow rate threshold of the fluid flow for at least one control device of the plurality of devices, automatically monitoring the temperature, the pressure and the flow rate of the fluid flow of the at least one control device of the plurality of devices by the software, and automatically closing the respective fluid valve of the at least one control device of the plurality of control devices by the software wherein either the temperature, the pressure or the flow rate threshold was exceeded.

In other exemplary embodiments the step of programming into the software the temperature threshold, the pressure threshold or the flow rate threshold of the fluid flow for at least one control device of the plurality of devices may include automatically monitoring the temperature, the pressure and the flow rate of the fluid flow by the software for a defined learning period of time and automatically establishing the temperature threshold, the pressure threshold or the flow rate threshold by the software during the defined learning period of time.

In other exemplary embodiments it may include the step of automatically alerting the user by the software when either the temperature, the pressure or the flow rate exceeds at least one of the thresholds, where the step of automatically alerting the user comprises a warning light, a warning sound, a text message, an email, a pager notification, a voicemail or other electronic communication means.

In other exemplary embodiments it may include the step of automatically closing a fluid valve of at least one control device of the plurality of devices by the software for a defined test period of time when a threshold has not been exceeded, and including the step of monitoring a pressure decay during the defined test period of time, and including the step of automatically closing the respective fluid valve of the at least one control device of the plurality of control devices when the pressure decay during the defined test period of time exceeds a predefined pressure decay threshold.

In other exemplary embodiments it may include providing a moisture sensor in communication with the central processor of the central hub and including the step of automatically closing a fluid valve of a respective control device of the plurality of devices when the moisture sensor detects a leak.

In other exemplary embodiments it may include providing a proximity sensor in communication with the central processor of the central hub. Furthermore, this may include providing a second temperature threshold, a second pressure threshold or a second flow rate threshold utilized for monitoring by the software, and including the step of the user commanding the software to utilize the second thresholds through the user interface or the step of the software automatically utilizing the second thresholds based upon an input from the proximity sensor. In this way a vacation mode can be entered where a burglar use or other unexpected fluid flow use may be quickly determined and the control device closed and an alert message sent to the user. Also, in this way use of the fluid can be better controlled based upon the movements of the user within a building or structure.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
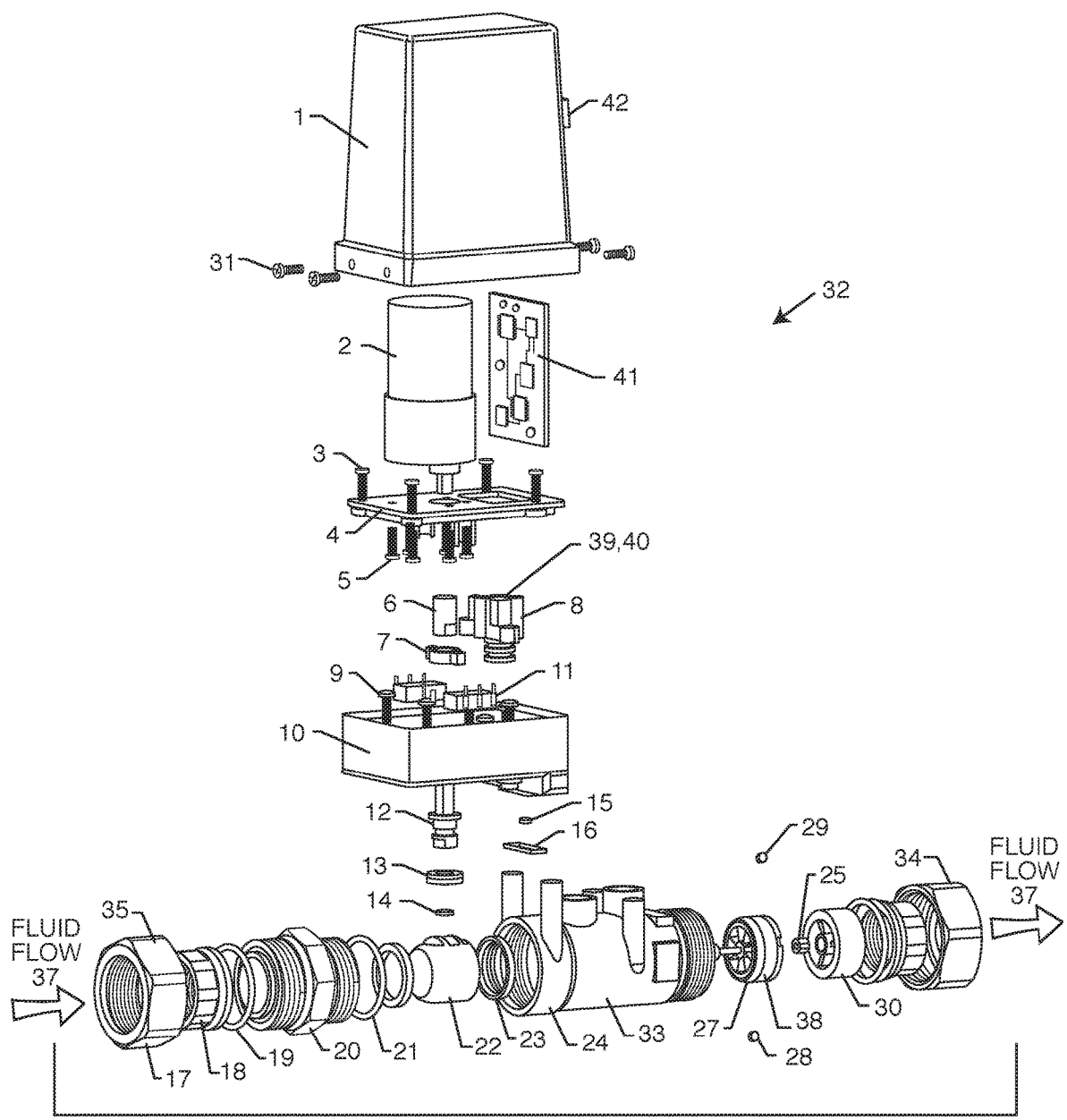
FIG. 1 is an exploded perspective view of an exemplary control device embodying the present invention.
Figure 2:
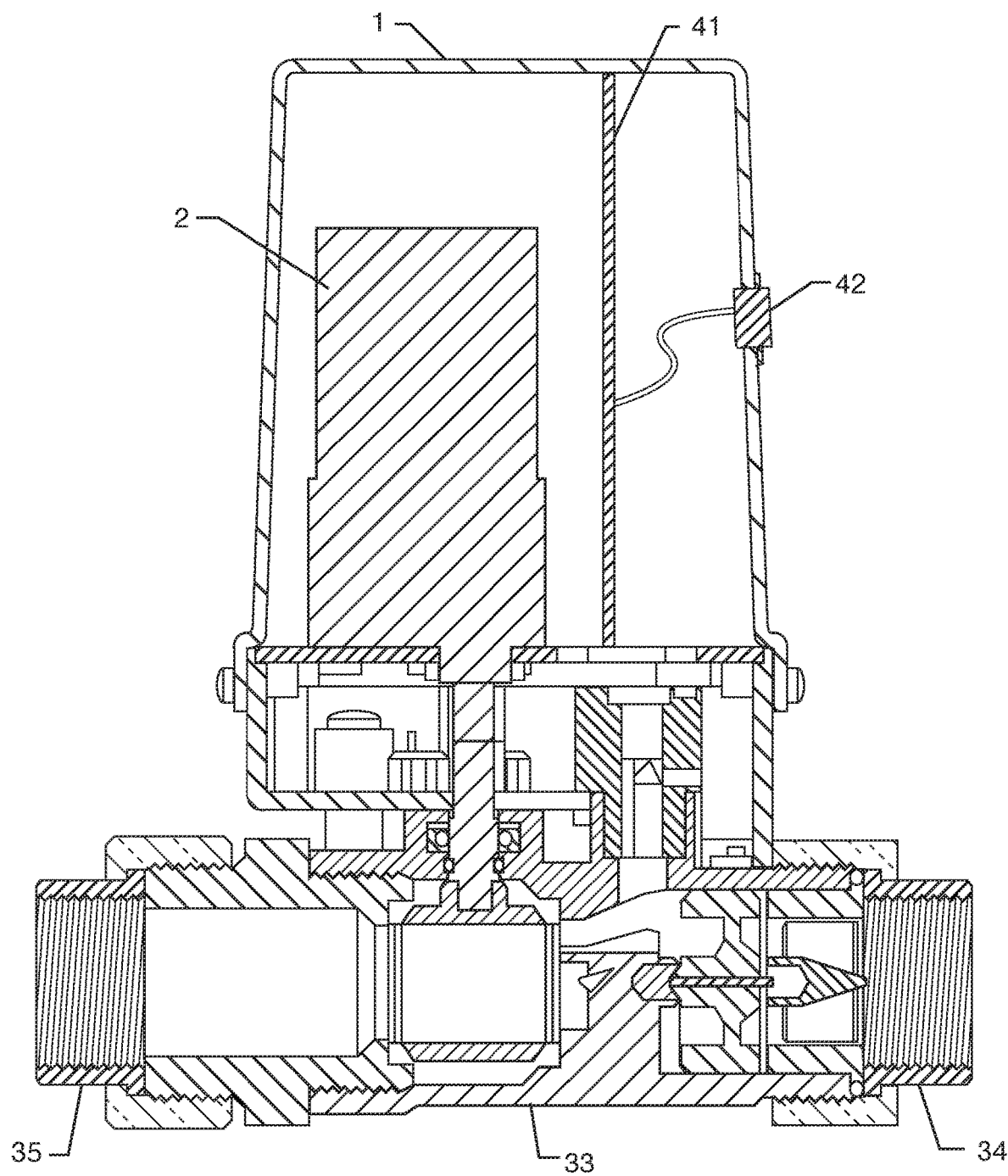
FIG. 2 is a sectional view taken through the assembled structure of FIG. 1.

FIG. 1 is an exploded perspective view of an exemplary control device 32 embodying the present invention. Each control device 32 includes a fluid pipe section 33 including a fluid inlet 35 and a fluid outlet 34 configured to be connectable in series to a fluid pipe 36. As shown in this particular embodiment, a brass union nut 17 screws onto an adapter 20 to retain the tail piece that is in turn attached to the inlet pipe. This attachment is sealed by the union ring 18.

A fluid valve 22 is coupled in series within the fluid pipe section 33 and is housed in the valve body 24. The fluid valve 22 controls a fluid flow 37 through the fluid pipe section 33. The adapter 20 abuts an adapter o-ring 21 and captures the ball valve 22 along with the plastic balls seats 23 against the valve body 24.

The motor 2 is coupled to the ball valve 22 through the motor coupling 6 which engages a limit stop 7. The valve stem 12 engages the motor coupling 6 and also the ball valve 22. The valve stem 12 also slips through the spring seal 13 and the o-ring 14 for providing a water tight seal. The tactile switches 11 indicate the position of the valve ball 22. The motor 2 may be directly connected to the ball valve 22 as shown or may be connected through a gear reduction system (not shown). Many gear reduction systems known to those skilled in the art may be used to effectively couple the motor 2 to the ball valve 22 such as belts, pulleys or gears. In this particular embodiment a ball valve 22 is used, but it is understood that other fluid valves could be utilized such as a gate valve, cylinder valve, globe valve, butterfly valve, diaphragm valve or needle valve. The motor 2 is connected to a motor baseplate 4 by screws 5. Screws 3 then fasten the baseplate 4 to the enclosure 10.

As can be seen much of these parts are captured in the enclosure 10. A cover or housing 1 encloses the motor 2 and other associated parts. It is understood that the enclosure 10 and cover 1 can be fashioned in a multitude of shapes and sizes and is not to be limited by this particular shape and configuration. Screws 9 help hold the enclosure 2 to the valve body 24. It is understood that the enclosure 10 and valve body 24 could be formed as a single part and not two separate parts attached with screws or fasteners 9. Screws 31 hold the cover 1 to the enclosure 10. It is understood that the cover 1 could be snap fitted to the enclosure 10 or other various latches and fasteners utilized.

A flow sensor 38 as shown herein includes a turbine wheel 27 that utilizes a magnet 28 and a turbine counter weight 29 placed opposite the turbine magnet 28 for balance. A turbine shaft 26 spins within the turbine bearing 25. A fluid flow 37 flows through the rear bearing support 30.

A Hall Effect sensor 15 and flow sensor PCB 16 are utilized to sense the rotation of the turbine wheel 27 due to the magnet 28. A Hall Effect sensor is a transducer that varies its output voltage in response to a magnetic field. Hall Effect sensors are commonly used to time the speed of wheels and shafts, such as for internal combustion engine ignition timing, tachometers and anti-lock braking systems. Herein, they are used to detect the position of the permanent magnet 28. It is understood by one skilled in the art that other sensors could be utilized to determine the flow rate of the fluid. Other sensors include a thermal mass flow sensors, an ultrasonic flow sensors and a piston sensor. In place of the Hall Effect sensor 15 a reed switch can also be used.

A transducer base 8 includes a temperature sensor 39 and a pressure sensor 40. The temperature sensor 39, pressure sensor 40 and Hall Effect sensor 15 all send their information to a control device processor 41. Tactile switches 11 are also connected to processor 41 and the motor is also powered by the processor 41. The control device processor 41 can then send the information to an input/output port 42. The control device 32 may also be powered through port 42.

Figure 7:
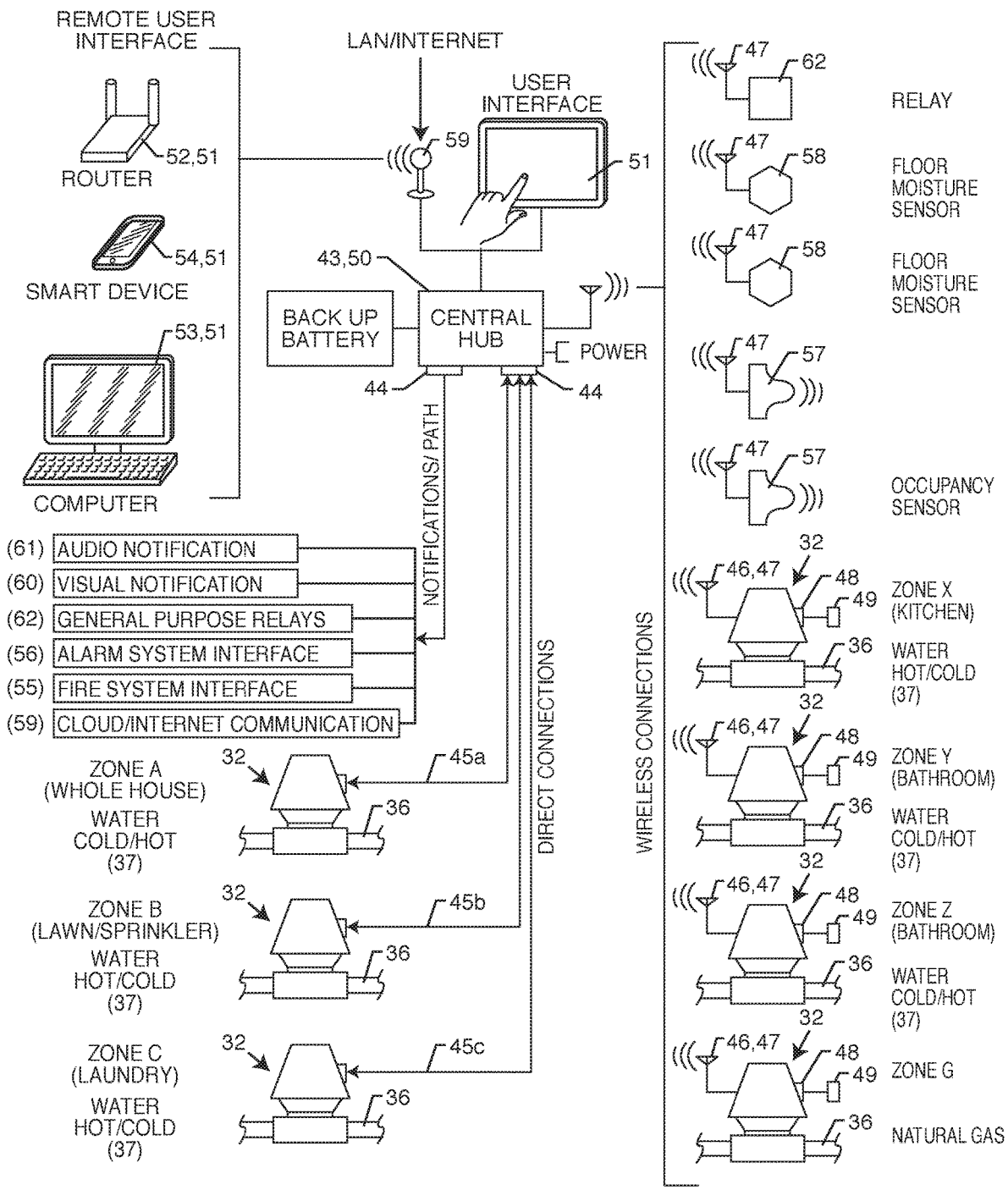
FIG. 7 is a schematic overview of an exemplary fluid monitoring and control system embodying the present invention.

The control device 32 communicates with a central hub 43. The communication can be from the input/output port 42 of the control device 32 to an input/output port 44 on the central hub 43. This means a hardwire 45 is connected between the control device 32 and the central hub 43. FIG. 7 shows three hardwires 45a-c however a single or a multitude of hardwires 45 and control devices 32 may be used.

Figure 3:
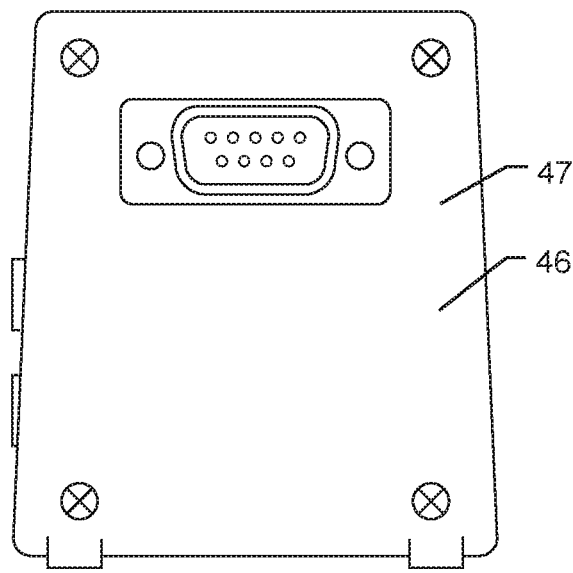
FIG. 3 is a front view of an exemplary wireless communication module attachable to the structure of FIG. 1.
Figure 4:
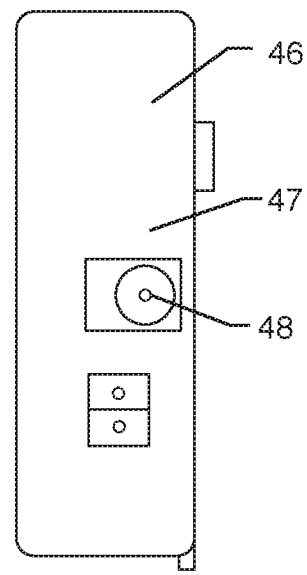
FIG. 4 is a side view of the structure of FIG. 3.
Figure 5:
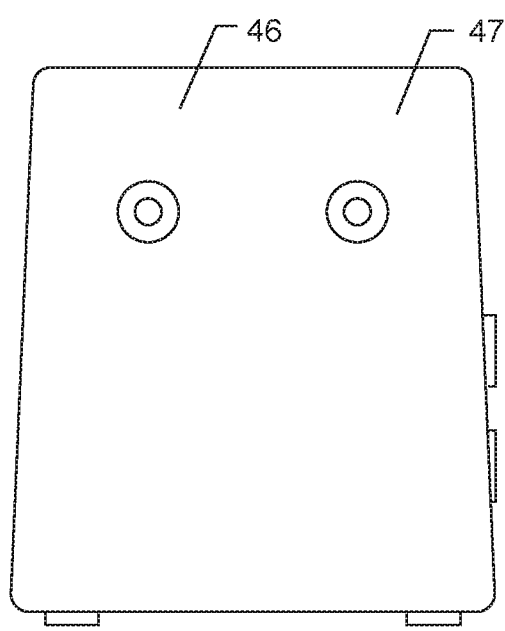
FIG. 5 is a back view of the structure of FIG. 3.
Figure 6:
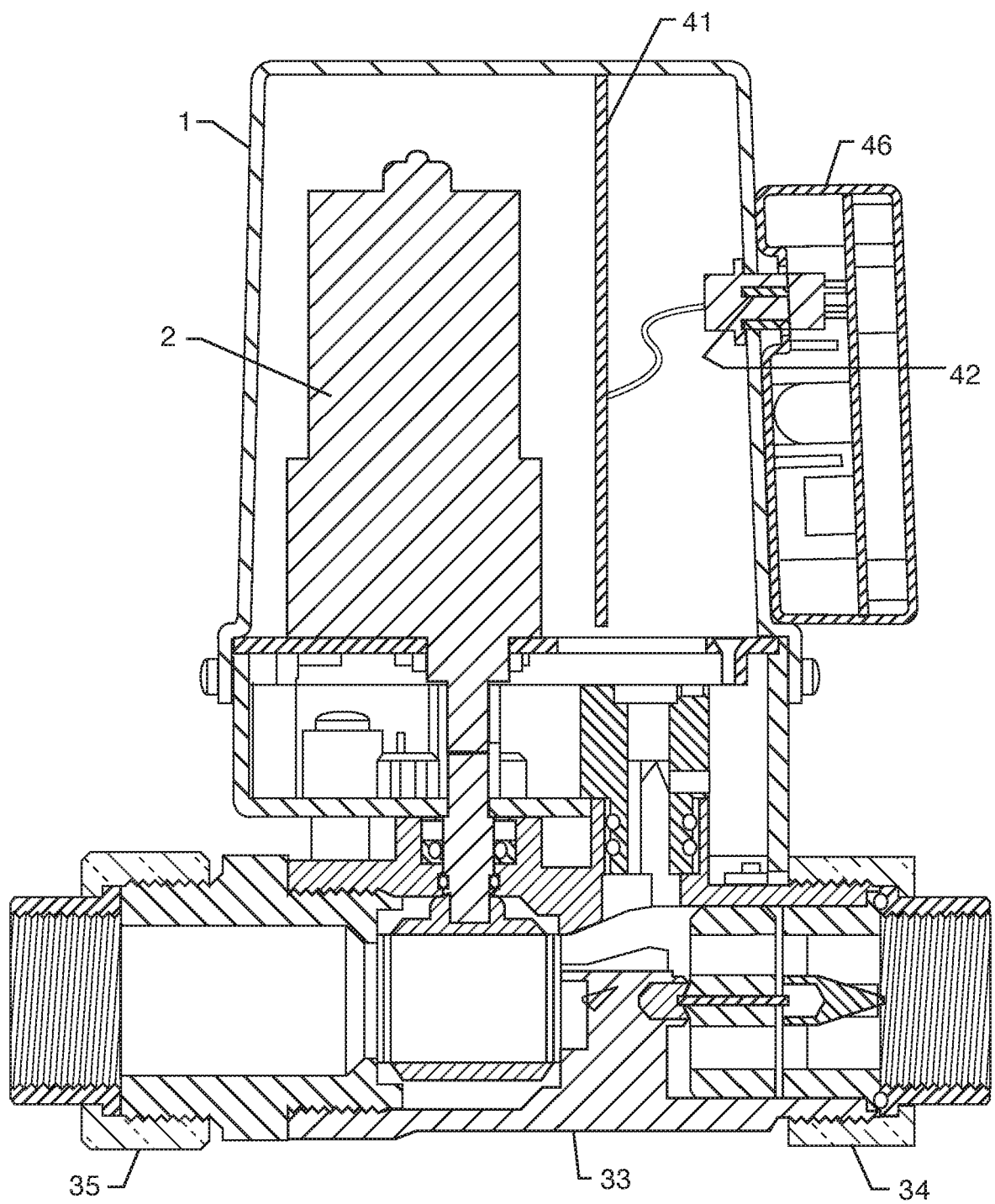
FIG. 6 is a sectional view similar to FIG. 2 now showing the wireless communication module.

Alternatively, a modular unit 46 as seen in FIGS. 3-5 can be attached to the cover 1 as seen in FIG. 6. The modular unit 46 contains a wireless communication transmitter and receiver 47. The modular unit 46 is designed to connect to the input/output port 42 of the control device 32. The modular unit 46 also contains a power input 48 for an external battery 49 or from a hardwired power supply line (not shown). The modular unit 46 can be utilized or not utilized and this does not change the design the control device 32 as this adds the adaptability and functionality of the system.

As is best seen in FIG. 7, the central hub 43 controls all of the control devices 32. FIG. 7 is just one embodiment the system can encompass, as many variations of FIG. & are possible. The central hub 43 has a central processor 50 and an input/output port 44. The central hub 43 also includes a user interface 51. The user interface 51 may be a touch computer screen or a screen and a keyboard. The user interface 51 may be physically attached or formed with the central hub 43. This means the central hub 43 can be mounted within an optimal location within a building or structure. After the initial setup the system will be functional without the local interface.

Alternatively, the user interface 51 may also include a remote user interface wirelessly connected via a router 52 or hardwire connected to the central hub 43. For example, the user interface may include a remote computer and keyboard 53 accessible over the Internet through a LAN connection or wireless connection 59. A smart phone or portable electronic device 54 could even access the central hub 43 via the cloud/internet 59 or specialized software running in the cloud or on the central hub 43 itself.

Alternatively, the user interface 51 could also be incorporated into a fire system 55 or a burglar/alarm system 56. Many fire systems and burglar/alarm systems already run sophisticated software already. One skilled in the art could adapt the central hub 43 to receive and send commands via the fire and burglar/alarm systems.

Even if the fire or burglar systems do not control the central hub 43, they can still send and receive information to the central hub 43. For instance, if the fire alarm is tripped, the central hub 43 could be configured to automatically close the valve on a control device controlling the flow of natural gas.

Other devices may also be hardwire connected or wirelessly connected to the central hub. This includes proximity/occupancy sensors 57 or moisture sensors 58. When a user is not located within the building, a proximity sensor can register this non-occurrence and shut various fluid flows. Alternatively, when a user is located in a certain location a fluid flow can be started. For instance, it is a common nuisance to have to wait a significant amount of time for hot water to reach a particular faucet. Some buildings constantly run a small amount of heated fluid through the pipes so that when needed hot water is quickly supplied. The present invention could be utilized to only provide this small amount of hot water flow based upon the proximity sensor. For instance, if a proximity sensor detected a user was near the bathroom the hot water to the shower could be started to pre-warm the water pipes. The signal generated by each sensor 57, 58 can either be used by one zone or multiple zones based on system set up.

The moisture sensor 58 can also send information to the central hub 43. For example, a moisture sensor 58 could be placed around a water heater, washing machine or under a sink to determine if a leak occurred. Alternatively, a moisture sensor could be placed within a basement to detect leaks. If a leak occurred, it could send a signal to the central hub 43 which would then shut the appropriate valve in a corresponding control device 32. Again, the moisture sensor 58 and occupancy sensor 57 could be directly connected to the central hub or wirelessly connected through a wireless communication transmitter and receiver 47.

Now understanding the structure of the present invention, many novel configurations may be utilized to create a custom system for a residence or commercial structure. FIG. 7 is just one example where three control devices 32 are utilized directly connected to the central hub and three control devices 32 are remotely connected via the modular unit 46 with the wireless communication transmitter and receiver 47. As can be seen, ZONE A is connected to the whole house. If water to the whole house needs to shut off it can by controlling just this single control device 32. The control device 32 in ZONE B is connected to the lawn/sprinkler system. This means that the lawn and sprinklers can be controlled from a single control device 32. For instance, if the residence is away from the home they can remotely turn off the flow of water to the sprinklers in case the news showed it had rained significantly and watering would be unneeded at this point. The control device for ZONE C controls the laundry room. If a floor moisture sensor 58 was placed within the laundry room, it could detect a leak and automatically turn just the flow of water off to the laundry room. This way, the water flow to the rest of the house would remain usable and flowing.

For locations that are further away, it may not be feasible or easy to directly connect the control device 32 to the central hub 43. This is where the wireless communication transmitter and receiver 47 are utilized. The control device 32 for ZONE X controls the kitchen. If work is needed to be performed in the kitchen to install new appliances or fix a leak, the control device 32 can just shut down the kitchen and not the rest of the house. Additionally, a moisture sensor 58 can be placed near the refrigerator to detect any leaks and automatically turn off the water. The control devices 32 for ZONE Y and ZONE Z control various bathrooms. It is very common for a shower or faucet to leak. Usually one valve controls the flow of water to the whole house. This means water to the whole house must be turned off when servicing any component in the piping system. With the present invention just a single bathroom can have the water turned off to easily allow maintenance to be performed while not disrupting the rest of the water supply.

Other uses not specifically covered in this disclosure are possible. Relays 62 can be utilized to send and receive information from the central hub 43 either directly or wirelessly to control various functions. The relays 62 are intended to be utilized just as easily as the rest of the components providing the user the ability to create a custom system. The relays 62 can be connected to any system or other use not directly mentioned in this disclosure. Relays 62 can be programed by a user to engage and create either a dry contact or produce a voltage based on variety of conditions.

Each individual control device 32 is configured to control and monitor all fluid flows including liquids, gas, air or any combination thereof. In this way the same control device 32 can be used for water or for natural gas. This increases the uses of the present invention to cover all fluids used in buildings. As shown herein, the control device 32 can control the flow of natural gas. If the fire alarm 56 or any device sends a signal, the natural gas can be shut off. For instance, a fire may be detected and the flow of gas should be shut down for safety. Also, if an earthquake occurs, this can damage pipes and creates leaks. The central hub 43 can shut down all control devices to ensure that no leaks are present.

Each control device measures all three states of a fluid: temperature, pressure and flow rate. In this way the control device can monitor all states of the fluid and create alarms, notifications or shut valves if the individual or any combination of values based on the desired algorithm exceeds a set threshold. For instance, if a pressure threshold was set at 75 psi and the water entering the house was above this, it would indicate that the pressure regulator for the house had failed and needed replaced. A warning signal or notification could be sent. For instance, a visual notification 60 or an auditory notification 61 could be sent by the central hub 43 itself or also sent to any of the remote user interfaces such as the router 52, the smart device 54 or the remote computer 53. If the temperature of the hot water was below a certain threshold, it could signal that the water heater was failing and send the user a notification or alarm. If the pressure to the water heater was rising above a threshold, it could signal that the water heater's blow off valve was malfunctioning and needed maintenance. If a small flow rate that was detected that was constant, it could signal a leak had occurred. By also measuring all states of the fluid, data on the usage and consumption of the fluid would also be available. A user could see exactly what zone was using the most fluid. This may be helpful in improving conservation of the fluid.

Through the software of the central hub 43, all of these notices and alerts for anything can be sent to the user interface or to the remote user interfaces. For example, if a leak was detected in the laundry room and the water shut off in ZONE C, a text message could be sent to the smart device 54. As one skilled in the art can now understand, the present invention can be configured in an endless multitude of ways and methods providing the user the ability to tailor the system to their own needs. The software controlling the central hub 43 can be an open platform so that others may easily modify and use it. Also, a simple user interface 51 and associated software can make programming the various control devices easy and effortless.

The software of the system can also be programmed to perform a learn mode. In some installations it may be difficult for a user to set the limits and parameters in a newly installed system. During a learn mode, for example two weeks, the system would monitor the usage and characteristics of the fluid under what is considered by the user as "Normal Conditions". Then, after the learn mode has completed and deployed, if the fluid characteristics stray outside of the bounds of the Normal Condition a notification can be sent. This added functionality would be helpful in identifying unusual occurrences that would normally go unnoticed.

The software is also configured to perform other novel methods described herein by utilizing the novel control devices 32. A zone isolation test (ZIT) can be performed by the software programmed into the central hub 43 controlling the individual control devices 32. A zone isolation test is when the central hub 43 closes a particular valve 22 at a preset time when it senses that a particular zone is not being used to then check for small leaks. For instance the system can be programmed to perform a zone isolation test once a day, once a week, once a month or any period of time desired. Alternatively, the system can use it's learn mode to determine the time and the day to perform the zone isolation test when downstream usage is most unlikely. Because the system can be programmed to perform the zone isolation test in off-peak hours it minimizes any impact a user might experience from a closed fluid line 36.

The zone isolation test isolates a downstream zone that is connected to a control device and monitors the pressure decay within the zone to then detect very small leaks that are not otherwise detected through other means, such as the flow rate sensor. A small leak can be a drip behind the wall that can cause mold or other water damage. It is very common for various plumbing fixtures to leak such as dripping faucets, leaky toilet valves or leaky appliances. Because the pressure decay due to a small leak is easier to detect than a very low flow rate due to a small leak, the pressure decay is one optimal way to identify small leaks.

Once a leak is detected, the system can send notifications on the user interface 51 or send notifications through the remote user interfaces such as texts or voicemail on the smart devices 54 or by email through the Internet to a remote computer 53. This then would notify the user of a problem so that corrective action could be taken or a zone can be configured to be immediately shut down upon detection of a small leak. Any of the notification methods discussed herein could be utilized.

Other novel flow analysis methods may be used to provide added capability to the present invention. For example, a total flow threshold may be set to occur over a defined period of time. For example, a total flow threshold may be set for a period of 6, 12 or 24 hours. If the total flow exceeds this threshold it could indicate that a major leak has occurred and all control devices 32 should close their respective valves 22. Because each control device 32 has a flow sensor 38, only the control devices 32 with the excess flow could be shut.

The total flow thresholds can also be adjusted automatically depending upon the proximity sensors or other means. For instance, the user may set the system into a vacation mode. In vacation mode the thresholds are very small as any use of fluid could signal a problem. Furthermore, a fluid flow during vacation mode could indicate that an intruder was present and used a fluid supply. For instance a burglar could drink a glass of water or flush the toilet which could then alert the authorities.

Various modes of operation include: a) a normal operation with confirmation of user presence (proximity/presence sensor activation); b) a normal operation without user presence; c) a vacation mode; and d) a manual mode that can be used for test of individual system components or operating each device valve manually.

As can be understood by those skilled in the art, the present invention can have other devices (wired or wireless) added to the system at any time to provide added capability and functionality. The present invention is not to be limited to just the devices disclosed herein as the present invention can detect and integrate a variety of devices and inputs.

As is taught herein, the previous embodiments disclosed monitoring and controlling the water that is used in a dwelling by the occupants. These technologies may be designed for dwellings with occupants and the parameters that provide notifications or actions to shut the water off may be configured and based on occupancy or offer machine learning to set its own parameters based on an occupant's usage patterns and/or behavior. Alternative modes of operation may be based on occupants being home or away, such as a maintenance mode or an inactive mode.

However, there is often a long period of time from the time plumbing system in a structure is connected to and pressurized with water until occupants actually move in. This is a period of time where the water system may be most venerable because of the following: vandalism; issues with plumbing materials and workmanship; point of use fixtures installation and malfunctioning; appliance malfunctioning, a point of use being left running inadvertently by tradesmen and the like. Unfortunately, builders may be not present when such issues occur which could then lead to extensive damage and expensive problems. Accordingly, builders and contractors are exposed to hundreds of millions of dollars of liability due to these factors.

Therefore, the present invention has created a pre-occupancy (pre-occupation) mode which can also be referred to as a "Builder Mode" and/or a "Construction Mode". The creation of a pre-occupancy mode in water monitoring and control devices allows the builder/contractor to protect the dwelling from the time water is turned on to the dwelling and the pipes are pressurized with water to until the dwelling is permanently occupied. Normally in this period the only utility that is available to the construction site is electricity and that may be limited to certain hours only. Accordingly, the present invention may also include a battery pack and/or battery back-up device such that power can be provided to the device even if local power is intermittent or not available to the site. The pre-occupancy mode may be configured to: not require Wi-Fi or internet connection; not require any pairing; and/or to enter pre-occupancy mode as long as the device is electrically connected while mechanically connected to a pressurized fluid system. Then, at a later point in time, the occupants can pair the device for permanent use without uninstalling the device form plumbing.

In such a pre-occupancy mode the device will protect the dwelling based on a set of preset parameters that does not change with usage pattern but may vary at different times of the day. For example, the parameters may be much tighter at night when construction crews are not present. One or more sets of preset parameters may be installed by the manufacturer of the device or optionally may be provided to the builder to set custom parameters when installing the device. Furthermore, optionally the device can modify the preset parameters with a local fluid monitoring and control system such as a smart phone.

In regards to how the device works, upon initial installation and after powering up the device, the embedded software may be configured to automatically default to the pre-occupancy mode. The device can be configured to start providing protection when the system is pressurized with pressures over a preset amount. As suggested, the preset pressure amount can also be set before the device is sold for installation. Once a preset pressure is detected, this may also then trigger a process within the software that the device is connected to pressurized media. This may then activate the pre-occupancy mode and software which can then start running various tests and monitoring routines based on preset parameters.

The test may include but not be limited to one or more of the following: pressure decay test to detect small leaks; maximum flow rate; maximum flow duration; maximum per event usage; combination of any or all the above with pressure; and/or a combination of any or all the above with temperature.

Because in the pre-occupancy mode the device may not send its normal warnings through paired devices, notifications can now be either be in the form of valve shut off or status light color change and/or lighting pattern. Additionally, an audible alarm may be part of the device that can indicate an issue has occurred. The device may also have a display that could communicate various conditions. Even though the device may not be connected to the internet or to a smart device, either through the use of sound, lights (LEDs) or a display the device may be able to communicate its current status.

The device may further be programed by means of one or more switches and LEDs (multi-color or mono-color) that are built into the device. A combination of switch presses and status LEDs can indicate the alternative parameter settings.

As can be understood by those skilled in the art, the pre-occupation mode still allows the device to provide value to the builder even though the device has not been connected/paired to the internet or to a smart device through local communication (such as Bluetooth or alike). The pre-occupation mode allows the device to operate and perform various tests without such connectivity and then is able to communicate the status through lights, displays, sounds or shut the water to the site.

The pre-occupation mode may also be configured to search for additional similar units. Typically, in construction each house may have a device installed. Therefore, closely disposed devices may be able to communicate with one another or form a mesh network. This feature provides the means to simplify the management at the sites with many devices in the same proximity (such as track housing sites) to set update parameters or make changes to all devices or one device through one or more end points. For example, a first device that experiences a problem may then be able to communicate with a second (third, fourth, fifth, etc.) device such that these other devices could also display the warning or provide the site management with specific notifications. Depending on the system configuration, a builder looking at device number 15, may be able to see device number 15 and understand that device number 6 is experiencing a problem.

Furthermore, because the devices may all be able to communicate with one another, if one device is connected to the internet or to a smart device, all of the other devices may also be controlled and monitored through this one device. Therefore, a builder can use a fluid monitoring and control system such as a smart phone running a custom made application that can then communicate with just one of the devices and yet be able to see the status and health of all the devices that are coupled together through the track housing while using the pre-occupancy mode.

There may be several ways that the device is configured to enter into a pre-occupancy mode, as the following ways are examples but are not intended to cover all the variations possible that are now understandable by those skilled in the art in light of the present teaching. For example, one way is that the control device processor is configured to enter into a pre-occupancy mode the first time the device is powered. The device will stay in the pre-occupancy mode until it connects to the fluid monitoring and control system where it can then be turned off by the user.

A second way is where the control device processor is configured to enter into a pre-occupancy mode when all of the following occurs: when it is electrically powered; when it has not been previously wirelessly connected to the fluid monitoring and control system; and when the pressure sensor detects a pre-occupancy pressure threshold has been reached indicating the fluid pipe section has been fluidically connected in series to the fluid pipe.

A third way is where the control device processor is configured to enter into a pre-occupancy mode when first powered and remain in the pre-occupancy mode until connected to the fluid monitoring and control system and commanded to exit the pre-occupancy mode.

A fourth way is to include a button that a user can depress to default the control device processor into the pre-occupancy mode.

A fifth way is to include an insert that can be manually removed by the end user, where when the insert is still installed the control device processor is configured to remain in the pre-occupancy mode. As can be seen, there are a multitude of ways that the device can be configured to enter into the pre-occupancy mode such that it protects the building even before the end user takes control the property.

A sixth way is to configure the device to default upon initial start-up in the pre-occupancy mode. Thereafter, when the device is paired for the first time to the fluid monitoring and control system, then will it not go back to the pre-occupancy mode but rather stay in the new settings obtained from the pairing to the fluid monitoring and control system. As can be understood by these teachings, any of the ways discussed herein may be combined together to form a multitude of ways of activating the pre-occupancy mode.

Although several embodiments have been described in detail for purposes of illustration, various modifications may be made to each without departing from the scope and spirit of the invention. Accordingly, the invention is not to be limited, except as by the appended claims.

What is claimed is:

1. A fluid control device, comprising:
a fluid pipe section including a fluid inlet and a fluid outlet configured to be connectable in series to a fluid pipe;
a fluid valve coupled in series within the fluid pipe section separating a fluid inlet side from a fluid outlet side, wherein the fluid inlet side corresponds to the fluid inlet of the fluid pipe section and the fluid outlet side corresponds to the fluid outlet of the fluid pipe section, the fluid valve controlling a fluid flow through the fluid pipe section;
an electric motor mechanically connected to the fluid valve;
at least one sensor coupled to the fluid pipe section, the at least one sensor comprising:
a temperature sensor monitoring a temperature of the fluid flow within the fluid pipe section;
a pressure sensor monitoring a pressure of the fluid flow within the fluid pipe section; and/or a flow rate sensor monitoring a flow rate of the fluid flow within the fluid pipe section;
a control device processor electrically connected to the electric motor and electrically connected to the at least one sensor; and
a communication device coupled to the control device processor, the communication device configured to be wirelessly connectable to a remotely disposed fluid monitoring and control system;
wherein the control device processor is configured to enter into a pre-occupancy mode when powered and never previously wirelessly connected to the fluid monitoring and control system;
wherein the pre-occupancy mode is configured to fully close the fluid valve if at least one of the following occurs:
exceeding a first preset threshold for a pressure decay test;
exceeding a second preset threshold for a maximum flow rate;
exceeding a third preset threshold for a maximum flow duration;
exceeding a fourth preset threshold for a maximum flow volume;
exceeding below a fifth preset threshold for a low temperature;
exceeding above a sixth preset threshold for a high temperature; and/or
exceeding above a seventh preset threshold for a high pressure.

2. The fluid control device of claim 1, wherein, if the pre-occupancy mode closes the fluid valve, the control device processor is configured to illuminate an LED or a display, the LED or the display being electrically connected to the control device processor.

3. The fluid control device of claim 1, wherein, if the pre-occupancy mode closes the fluid valve, the control device processor is configured to sound an audible alarm by a speaker, the speaker being electrically connected to the control device processor.

4. The fluid control device of claim 1, wherein the fluid control device is configured to be in wireless communication with a second fluid control device disposed a distance apart.

5. The fluid control device of claim 4, wherein the second fluid control device is configured to illuminate an LED or a display or sound an audible alarm by a speaker if the fluid control device has shut the fluid valve, wherein the LED, the display or the audible alarm is electrically connected to a control device processor of the second fluid control device.

6. The fluid control device of claim 1, wherein the fluid control device is configured to exit the pre-occupancy mode when the fluid control device is wirelessly connected to the fluid monitoring and control system and a user has requested the pre-occupancy mode be turned off.

7. The fluid control device of claim 1, wherein the communication device comprises a wireless communication transmitter and receiver configured to wirelessly communicate with the fluid monitoring and control system, the transmitter and receiver can be integrated inside the housing 1, such that no external modular units are needed.

8. The fluid control device of claim 1, including a housing 1 enclosing at least the electric motor and the control device processor.

9. The fluid control device of claim 1, wherein the fluid flow comprises a liquid flow, a gas flow, an air flow or a combination thereof.

10. The fluid control device of claim 1, including a battery or a power input electrically connected to the control device processor.

11. The fluid control device of claim 1, wherein the pressure sensor is disposed on the fluid outlet side of the fluid valve and wherein no pressure sensor is disposed on the fluid inlet side of the fluid valve.

12. The fluid control device of claim 1, wherein the flow rate sensor is a turbine wheel.

13. The fluid control device of claim 1, wherein the fluid valve is a ball valve.

14. The fluid control device of claim 1, wherein the temperature sensor and the pressure sensor are both disposed on the fluid outlet side of the fluid valve.

15. The fluid control device of claim 1, wherein the temperature sensor, the pressure sensor and the flow rate sensor are all disposed on the fluid outlet side of the fluid valve.

16. The fluid control device of claim 1, wherein the fluid monitoring and control device comprises a portable electronic device, a computer or a smart phone.

17. A fluid control device, comprising:
a fluid pipe section including a fluid inlet and a fluid outlet configured to be connectable in series to a fluid pipe;
a fluid valve coupled in series within the fluid pipe section separating a fluid inlet side from a fluid outlet side, wherein the fluid inlet side corresponds to the fluid inlet of the fluid pipe section and the fluid outlet side corresponds to the fluid outlet of the fluid pipe section, the fluid valve controlling a fluid flow through the fluid pipe section;
an electric motor mechanically connected to the fluid valve;
a temperature sensor monitoring a temperature of the fluid flow within the fluid pipe section;
a pressure sensor monitoring a pressure of the fluid flow within the fluid pipe section;
a flow rate sensor monitoring a flow rate of the fluid flow within the fluid pipe section;
a control device processor controllably electrically connected to the electric motor and electrically connected to the temperature, pressure and flow rate sensors; and
a communication device coupled to the control device processor, the communication device configured to be wirelessly connectable to a remotely disposed fluid monitoring and control system;
wherein the control device processor is configured to enter into a pre-occupancy mode when all of the following occurs:
when it is electrically powered;
when it has not been previously wirelessly connected to the fluid monitoring and control system; and
when the pressure sensor detects a pre-occupancy pressure threshold has been reached indicating the fluid pipe section has been fluidically connected in series to the fluid pipe;
wherein the pre-occupancy mode is configured to open the fluid valve and then fully close the fluid valve if at least one of the following occurs:
exceeding a first preset threshold for a pressure decay test;
exceeding a second preset threshold for a maximum flow rate;
exceeding a third preset threshold for a maximum flow duration;
exceeding a fourth preset threshold for a maximum flow volume;

exceeding below a fifth preset threshold for a low temperature;

exceeding above a sixth preset threshold for a high temperature; and/or exceeding above a seventh preset threshold for a high pressure.

18. A fluid control device, comprising:

a fluid pipe section including a fluid inlet and a fluid outlet configured to be connectable in series to a fluid pipe;

a fluid valve coupled in series within the fluid pipe section separating a fluid inlet side from a fluid outlet side, wherein the fluid inlet side corresponds to the fluid inlet of the fluid pipe section and the fluid outlet side corresponds to the fluid outlet of the fluid pipe section, the fluid valve controlling a fluid flow through the fluid pipe section;

an electric motor mechanically connected to the fluid valve;

at least one sensor coupled to the fluid pipe section, the at least one sensor comprising:

a temperature sensor monitoring a temperature of the fluid flow within the fluid pipe section;

a pressure sensor monitoring a pressure of the fluid flow within the fluid pipe section; and/or a flow rate sensor monitoring a flow rate of the fluid flow within the fluid pipe section;

a control device processor electrically connected to the electric motor and electrically connected to the at least one sensor; and a communication device coupled to the control device processor, the communication device configured to be wirelessly connectable to a remotely disposed fluid monitoring and control system;

wherein the control device processor is configured to enter into a pre-occupancy mode when first powered and remain in the pre-occupancy mode until connected to the fluid monitoring and control system and commanded to exit the pre-occupancy mode;

wherein the pre-occupancy mode is configured to fully close the fluid valve if at least one of the following occurs:

exceeding a first preset threshold for a pressure decay test;

exceeding a second preset threshold for a maximum flow rate;

exceeding a third preset threshold for a maximum flow duration;

exceeding a fourth preset threshold for a maximum flow volume;

exceeding below a fifth preset threshold for a low temperature;

exceeding above a sixth preset threshold for a high temperature; and/or exceeding above a seventh preset threshold for a high pressure.

* * * * *